United States Patent
Nishimura

[15] 3,678,952
[45] July 25, 1972

[54] PRESSURE FLUID CIRCUIT IN AUTOMATIC TRANSMISSION APPARATUS

[72] Inventor: Sadanori Nishimura, Tokyo, Japan
[73] Assignee: Honda Giken Kogyo Kabushiki Kaisha, Tokyo, Japan
[22] Filed: Oct. 22, 1969
[21] Appl. No.: 868,405

[30] Foreign Application Priority Data
    Oct. 22, 1968    Japan.....................43/76473

[52] U.S. Cl..................137/53, 138/43, 137/501
[51] Int. Cl......................................G05d 13/38
[58] Field of Search..............137/47, 51, 53, 54, 56, 58, 137/501; 138/43; 192/103 F, 105 F

[56] References Cited

UNITED STATES PATENTS

| | | | |
|---|---|---|---|
| 3,542,046 | 11/1970 | Moan | 137/54 |
| 1,640,842 | 8/1927 | Loomis | 137/501 |
| 1,879,197 | 9/1932 | Greenwald | 138/43 |
| 2,272,684 | 2/1942 | Vickers | 137/501 X |
| 2,881,793 | 4/1959 | Lee | 138/501 |
| 2,997,059 | 8/1961 | Mortimer | 137/505.25 X |
| 3,265,081 | 8/1966 | Stockton et al. | 137/56 X |

Primary Examiner—Robert G. Nilson
Attorney—Waters, Roditi, Schwartz & Nissen

[57] ABSTRACT

A pressure fluid circuit in an automatic transmission comprises a line pressure circuit connected to the discharge opening of a pump and to an orifice controlled by a valve which in turn is connected to a governor circuit containing a leak valve controlled by centrifugal force corresponding to the speed of the output shaft of the transmission. The valve is constructed to provide a flow resistance such as a throttling effect which is varied by a slide valve member in response to the pressure in the governor circuit in order that the pressure can remain substantially constant and never drop below a minimum pressure necessary to operate the clutches of the transmission.

3 Claims, 3 Drawing Figures

Patented July 25, 1972

INVENTOR
Sadanori Nishimura

INVENTOR
Sadenori Nishimura 3,678,952

PRESSURE FLUID CIRCUIT IN AUTOMATIC TRANSMISSION APPARATUS

BRIEF SUMMARY OF THE INVENTION

There has been hitherto proposed, in an automatic transmission for a motorcar, an apparatus in which a main circuit is in communication with a discharge opening of a pump driven by a driving source such as an internal combustion engine, or the like, so that a line pressure for operating a friction clutch may be obtained in this circuit, and a branch circuit from the main circuit, through an orifice, is provided with a leak valve urged to a closing position by centrifugal force corresponding to the speed of revolution of an automatic transmission output shaft, such as a propeller shaft, so that a governor pressure for controlling a shift valve may be obtained in this branch circuit.

In this circuit, however, the construction of the abovementioned orifice is not always simple. Namely, if the orifice is too small in its flow resistance, when the speed of the output shaft is low and the leak valve is largely opened, a large amount of liquid leaks out through the valve and the liquid within the main circuit is influenced thereby, resulting in a large pressure drop, and under certain circumstances there is a danger that the line pressure becomes so low that it cannot operate the clutch. If, on the other hand, the orifice is too large in its flow resistance, when the speed of the output shaft is high, a large amount of governor pressure liquid cannot be immediately obtained within the governor pressure circuit, so that delay in control operation is produced.

An object of this invention is to provide an apparatus free from the above defect, and is characterized in that, in such a circuit apparatus the line pressure circuit is in communication with a discharge opening of a pump driven by an internal combustion engine and the governor pressure circuit is diverged through an orifice from said line pressure circuit and is provided with a leak valve urged toward its closing position by a centrifugal force corresponding to the speed of the output shaft, said orifice being constructed of automatic variable type such that it is increased in its flow resistance when the governor pressure is low, but is decreased in its flow resistance when the governor pressure is high.

According to a feature of this invention, the orifice itself is fixed and a pressure control valve of a throttle operation type such that the throttle degree thereof is increased in accordance with increase of its outflow pressure for keeping the outflow pressure nearly constant, is interposed in a circuit connecting the line pressure circuit and the orifice, this pressure control valve being so arranged that it is opened to be in an inoperative condition when the governor pressure is high but is in a throttle operation when the governor pressure is low. In this case, the pressure control valve may be so constructed that it is urged toward its opening position by the governor pressure so as to be opened when the governor pressure is high. Alternatively, said valve is provided on one side thereof with a bypass valve urged toward its opening position by the governor pressure so that said bypass valve may be opened when the governor pressure is high.

DETAILED DESCRIPTION

Figure 1:
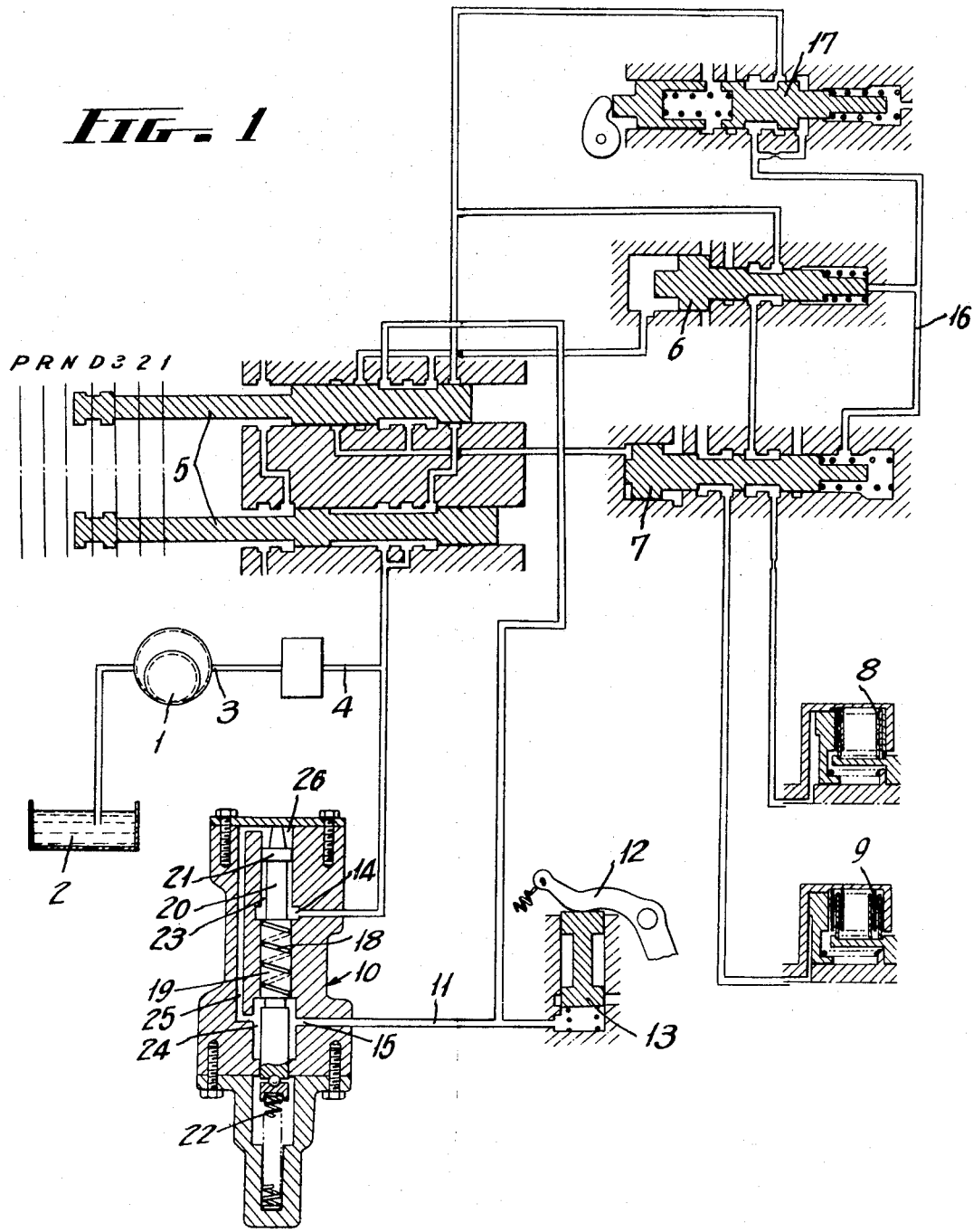
FIG. 1 is a hydraulic circuit diagram of one embodiment of this invention.

Referring to FIG. 1 showing an embodiment of this invention, numeral 1 denotes a pump driven by an internal combustion engine, numeral 2 denotes a tank connected to an inlet opening of said pump 1, and there is provided a line pressure circuit 4 in communication with an outlet or discharge opening 3 of said pump 1. The circuit 4 is in communication, through a manually operable change-speed operation valve 5 and two stage front and rear shift valves 6,7, with friction clutches 8,9 interposed, in low speed and high speed systems, respectively, so that these clutches 8,9 may be selectively operated by the line pressure within the circuit 4.

A circuit 11 diverges from the line pressure circuit 4 and includes a controlled orifice means 10. The circuit 11 is provided with a leak valve 13 which is urged toward its closing position by centrifugal force produced in accordance with the r.p.m. of the transmission output shaft, for example, by means of a centrifugal weight lever 12, so that the circuit 11 is constituted as a circuit of a governor pressure corresponding to the speed of the output shaft. Numerals 14 and 15 denote inlet and outlet openings of said orifice means 10. This circuit 11 is in communication with one end of each of said shift valves 6,7 so that these valves 6,7 may be switched, depending on the speed of the output shaft. Numeral 16 denotes a throttle pressure circuit in which a throttle pressure corresponding to the engine output power is produced, and this circuit 16 is connected to the other ends of the shift valves 6,7 for operating the valves in cooperation with the governor pressure mentioned above.

The construction described above, with the exception of the details of orifice means 10, is conventional so that no further detailed explanation will be necessary.

If, in this circuit apparatus, the speed of the output shaft is low and the leak valve 13 is opened wide, the liquid within the circuit 11 leaks in great quantities therethrough, so that the fluid pressure within the circuit 4, that is, the governor pressure, will be substantially lowered and consequently there is a danger that it will become so low as to be unable to operate the clutches 8,9.

This invention seeks to overcome this and as shown in FIG. 1 said orifice means 10 is constructed to be of automatically variable type. Namely, the orifice means 10 comprises a cylindrical housing, and slidably mounted in the housing is a valve body comprising a first piston 19 having a spiral groove 18 formed in the peripheral surface thereof, and a second piston 21 connected thereto through a small diameter portion 20. The valve body is urged in one direction (upward in FIG. 1) by a spring 22. There is formed in the housing an intermediate chamber 23 connected to the inlet opening 14, an end chamber 24 connected to the outlet opening 15 and another end chamber 26 connected to the chamber 24 through a conduit 25. The liquid flows from inlet opening 14 to outlet opening 15 through the spiral groove 18.

If, in this embodiment, the speed of the output shaft is high and the governor pressure within the circuit 11 is high, the valve body is moved downward in the drawing against the opposition of spring 22 by being pressed by the pressure within the upper end chamber 26, whereby the spiral groove 18 at the periphery of the piston 19 is decreased in effective length and the flow resistance of the orifice means 10 is lowered. Accordingly, the line pressure within the circuit 4, is led, substantially as is, to the leak valve 13. If, however, speed of the output shaft is lowered and accordingly the governor pressure within the circuit 11 is lowered, the valve body is moved upwards in the drawing by the action of the spring 22, whereby the spiral groove 18 is increased in its effective length and the flow resistance of the orifice means 10 becomes large. Accordingly, the line pressure within the circuit 4 is prevented from undergoing a large pressure drop.

Figure 2:
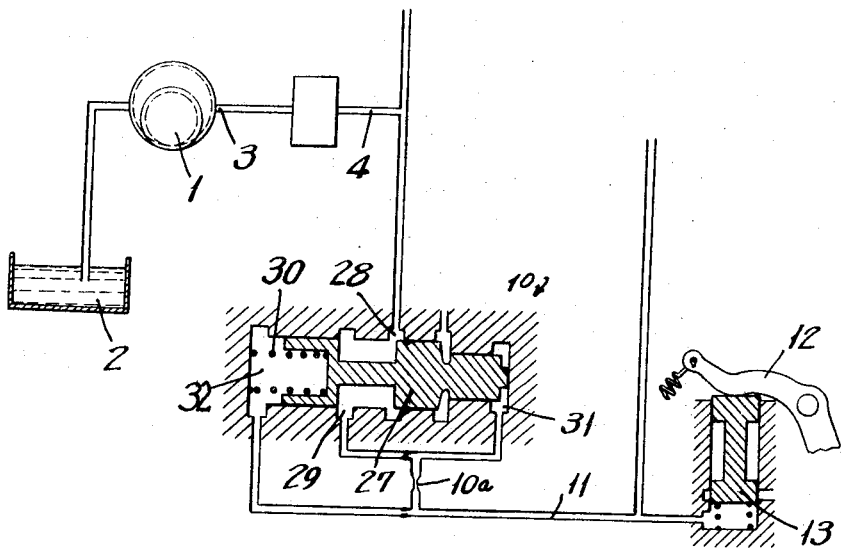
FIG. 2 is a hydraulic circuit diagram of a part of a modified embodiment of this invention.

FIG. 2 illustrates a modified embodiment of this invention. In this modified embodiment, the orifice means 10 comprises an orifice 10a constructed so as not to be variable and a throttle operation type pressure control valve 27 interposed between circuit 4 and orifice 10a, the valve 27 having one side inlet opening 28 and a side outlet opening 29. This valve 27 is urged toward its opening position by end spring 30 and is urged toward its closing position by the pressure within end pressure chamber 31 connected to the outlet opening 29 such that the valve 27 is increased and decreased in throttle degree in accordance with the increase and decrease of the outflow pressure at the outlet opening 29. Consequently, the outflow pressure at the outlet opening 29, that is, the supply pressure to the orifice 10a, may be kept at a substantially constant pressure determined by the strength of the spring 30. In the embodiment of FIG. 2, the valve 27 additionally includes, on the side of spring 30, a pressure chamber 32 connected to the governor pressure circuit 11 so that the valve 27 is urged toward its opening position also by the governor pressure.

If, accordingly, the speed of the output shaft is comparatively high and the governor pressure is comparatively high, this pressure cooperates with the spring 30 to open the valve 27, so that the line pressure supplied from the inlet opening 28 is supplied, as is, to the orifice 10a through the outlet opening 29. If, however, the speed of the output shaft is lowered to open the leak valve 13 wide and the governor pressure becomes low, the valve 27 is displaced in opposition to spring 30, so that the valve performs a throttle operation in accordance with the outflow pressure at the outlet opening 29 for effecting a predetermined pressure control operation for keeping the outflow pressure at the outlet opening 29 nearly constant. Accordingly, the line pressure may be automatically kept at this control value so that the line pressure can never become low enough not to be able to operate the clutches 8,9 and the governor pressure can be kept at a predetermined low pressure.

Figure 3:
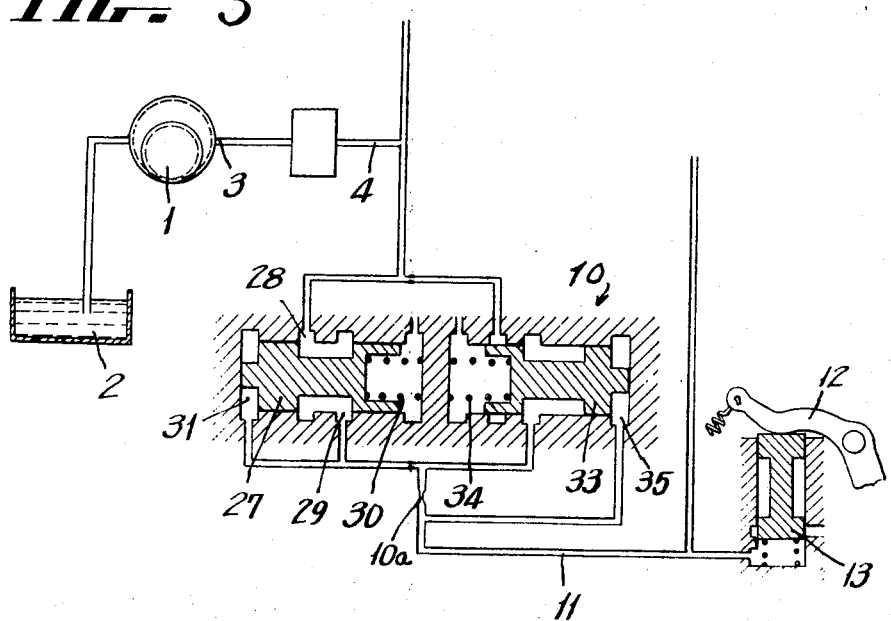
FIG. 3 is a hydraulic circuit diagram of a part of another modified embodiment of this invention.

Another modification is illustrated in FIG. 3. This modification is the same as the one in FIG. 2, insofar that the valve 27 has the spring 30 at one end and the pressure chamber 31 at its other end connected to the outlet opening 29, but this embodiment is different in that the end pressure chamber 32 acted on by the governor pressure is omitted and instead a bypass valve 33 is connected in parallel with the valve 27. This bypass valve 33 is urged toward its closing position by a spring 34 and toward its opening position by the pressure within a pressure chamber 35 connected to the governor pressure circuit 11 so that the valve 33 is ordinarily closed. If, accordingly, the speed of the output shaft is high to cause the leak valve 13 to move toward its closing position and the governor pressure is comparatively high, said pressure acts on the bypass valve 33 so as to open the same. Therefore, the pressure at the inlet opening 28, that is, the line pressure is supplied substantially as is to the orifice 10a through the bypass valve 33. If, however, the speed of the output shaft becomes low to open the leak valve 13 wide and the governor pressure is lowered, the bypass valve 33 is closed by the spring 34 so that the pressure fluid at the inlet opening 28 is supplied to the orifice 10a from the outlet opening 29 through the throttle valve 27 and during this period the throttle valve 27 is increased and decreased in its throttle degree in accordance with the pressure at the outlet opening 29 for automatically keeping the pressure at the outlet opening 29 substantially constant as determined by the spring 30 force, whereby the line pressure within the line pressure circuit 4 is prevented from being substantially lowered and also the governor pressure can be maintained at a predetermined low pressure, and thus this embodiment gives almost the same advantages as the above embodiment.

Thus, in these embodiments, when the leak valve is comparatively closed and the governor pressure is comparatively high, the throttle valve is opened so that the line pressure is supplied substantially as is to the orifice means, resulting in no inconvenience. If, however, the leak valve is opened wide and the governor pressure is low, the throttle valve performs a throttle operation so as to keep the outflow pressure nearly constant so that lowering of the line pressure can be prevented, and the governor pressure can be maintained at a predetermined low pressure.

What is claimed is:

1. In a pressure fluid circuit in an automatic transmission wherein a line pressure circuit is connected to a discharge opening of a pump driven by a driving source and a governor pressure circuit is supplied via an orifice means from said line pressure circuit and is provided with a leak valve urged toward its closing position by a centrifugal force corresponding to the speed of an output shaft of the transmission, an improvement wherein said orifice means comprises a fixed orifice between said line pressure circuit and said governor pressure circuit, a throttle operation valve between said line pressure circuit and said fixed orifice, said throttle valve having an inlet opening connected to the line pressure circuit and an outlet opening connected to the fixed orifice, and a by-pass valve connected in parallel with the throttle valve between the line pressure circuit and the governor pressure circuit such that the by-pass valve is opened by the pressure in the governor pressure circuit when the governor pressure is high to permit unrestricted flow from the line pressure circuit to the fixed orifice, said by-pass valve being closed when the governor pressure is low whereupon said throttle valve provides variable flow resistance between the line pressure circuit and the fixed orifice.

2. An improvement as claimed in claim 1 comprising spring means acting on the throttle valve to open said inlet opening, and a chamber connected to said outlet opening to apply the outlet pressure to said throttle valve and vary the degree of opening of said inlet opening to keep said pressure at the outlet opening substantially constant.

3. An improvement as claimed in claim 2, wherein said bypass valve has a chamber connected to the governor pressure circuit and a spring acting on the valve in opposition to the pressure in said chamber.

* * * * *